(12) United States Patent
Chu et al.

(10) Patent No.: US 8,108,193 B2
(45) Date of Patent: Jan. 31, 2012

(54) COLLABORATION FRAMEWORK FOR MODELING

(75) Inventors: Hyun S. Chu, Elmsford, NY (US); Scott R. Crowther, LaGrangeville, NY (US); Barbara A. Eckman, West Chester, PA (US); Abraham G. Guerra, Brewster, NY (US); Rick A. Hamilton, II, Charlottesville, VA (US); Clifford A. Pickover, Yorktown Heights, NY (US); Peter P. Rodriguez, Pleasanton, CA (US); Jaime Solari, New York, NY (US); Murali Vridhachalam, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 12/199,920

(22) Filed: Aug. 28, 2008

(65) Prior Publication Data

US 2010/0057415 A1 Mar. 4, 2010

(51) Int. Cl.
G06F 17/50 (2006.01)
(52) U.S. Cl. .............. 703/13; 703/22; 703/6; 705/26.41
(58) Field of Classification Search .................... 703/13, 703/14, 18, 22, 6; 705/2, 26, 40, 26.41; 706/12, 706/60, 45, 46; 702/22
See application file for complete search history.

(56) References Cited

U.S. PATENT DOCUMENTS

| | | | |
|---|---|---|---|
| 5,499,180 A | 3/1996 | Ammirato et al. | |
| 6,542,880 B2* | 4/2003 | Rosenfeld et al. | ............. 706/45 |
| 7,287,231 B2 | 10/2007 | Reichenthal et al. | |
| 7,295,116 B2 | 11/2007 | Kumar et al. | |
| 7,801,771 B1* | 9/2010 | Sirota et al. | ............. 705/26 |
| 2003/0004746 A1 | 1/2003 | Kheirolomoom et al. | |
| 2003/0217000 A1* | 11/2003 | Wichman | ............. 705/40 |
| 2005/0049988 A1* | 3/2005 | Dahlquist et al. | ............. 706/46 |
| 2007/0005266 A1* | 1/2007 | Blevins et al. | ............. 702/22 |
| 2007/0129927 A1 | 6/2007 | Chussil et al. | |
| 2007/0174225 A1* | 7/2007 | Blevins et al. | ............. 706/60 |
| 2008/0027704 A1* | 1/2008 | Kephart et al. | ............. 703/22 |
| 2008/0109205 A1* | 5/2008 | Nasle | ............. 703/18 |
| 2009/0006129 A1* | 1/2009 | Thukral et al. | ............. 705/2 |

(Continued)

OTHER PUBLICATIONS

Hussain et al., "A robust methodology for prediction of trust and reputation values", ACM, 2008.*

(Continued)

*Primary Examiner* — Kandasamy Thangavelu
(74) *Attorney, Agent, or Firm* — John R. Pivnichny; Hoffman Warnick LLC

(57) ABSTRACT

A modeling solution, which enables various users to create, use, and evaluate models, such as scientific models, in various scenarios is provided. To this extent, the modeling solution can define a model using one or more model components, each of which is configured to implement a modeling function using a set of standard execution rules. Additionally, the modeling solution can manage attribute data for each model/model component, which can include evaluation data for the corresponding model/model component. A user can review the attribute data and decide on a model/model component to use in a scenario. Subsequently, the user can provide initialization data for the scenario. The scenario can be executed, and result data for the scenario can be stored together with the initialization data. Users also can evaluate the scenario. In an embodiment, multiple users are classified into multiple tiers, and evaluation data is managed for each tier, thereby allowing users to effectively evaluate the model/model component among groups of users with similar concerns.

23 Claims, 4 Drawing Sheets

U.S. PATENT DOCUMENTS

2010/0100510 A1* 4/2010 Balaban et al. .................. 706/12

OTHER PUBLICATIONS

Weidl et al., "Object oriented Bayesian networks for condition monitoring . . . : methodology and process", University of Stuttgart, 2005.*

Culhane, A,A, "Development of an object detection system for human supervisory control of a UAV in urban environments", Virginia Tech, 2007.*

Parsons et al., "Validation methods for an accessible user interface for a rehabilitation robot", User Access Interface Society, 2006.*

Munnesawang et al., "Adaptive video indexing and automatic/semi-automatic relevance feedback", IEEE 2005.*

Song, B., "Workload modeling for parallel computers", The university of Dortmund, 2006.*

Polyvyanyy, A, "Evaluation of a novel information retrieval model: eTVSM", Universitat, Potsdam, 2007.*

* cited by examiner

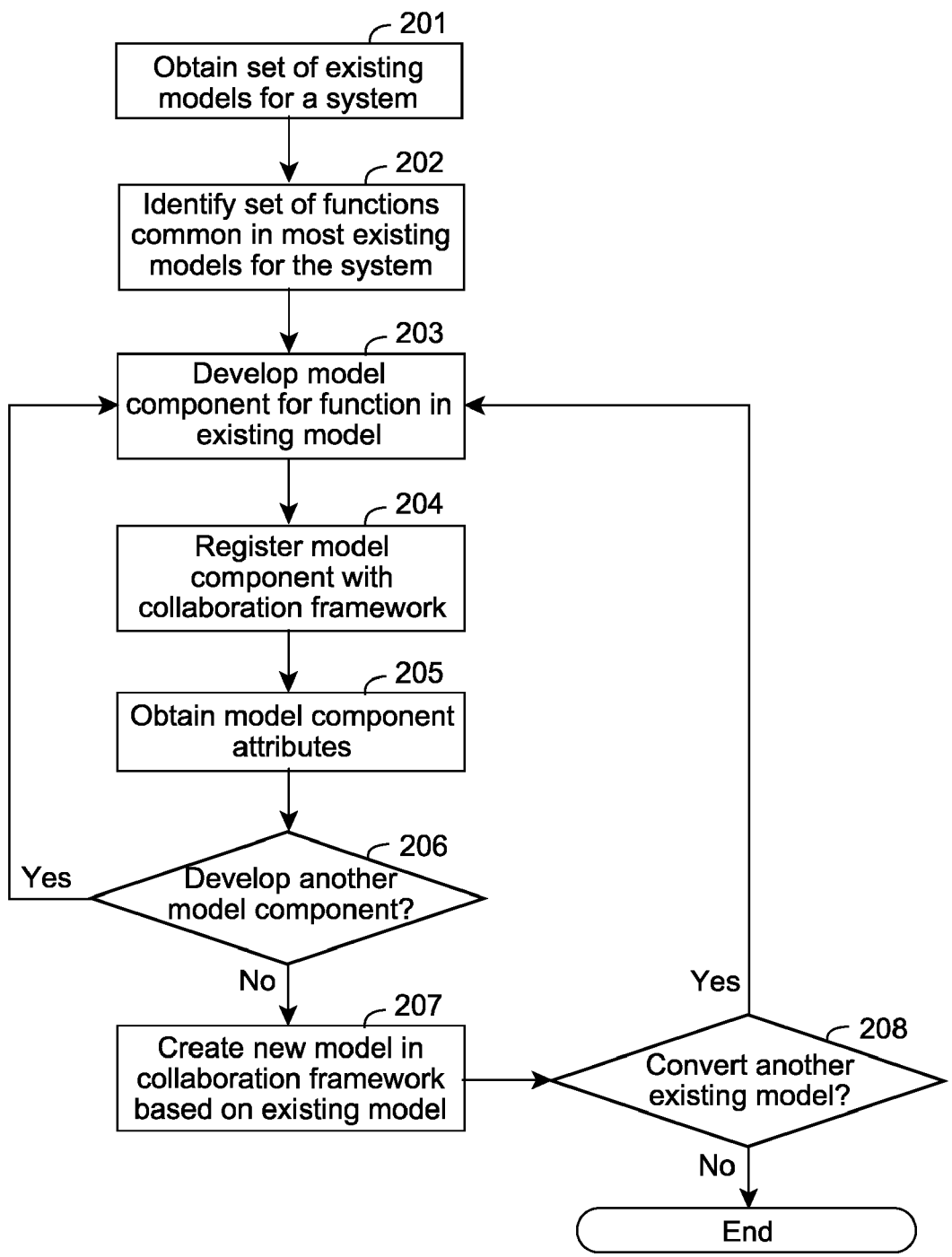

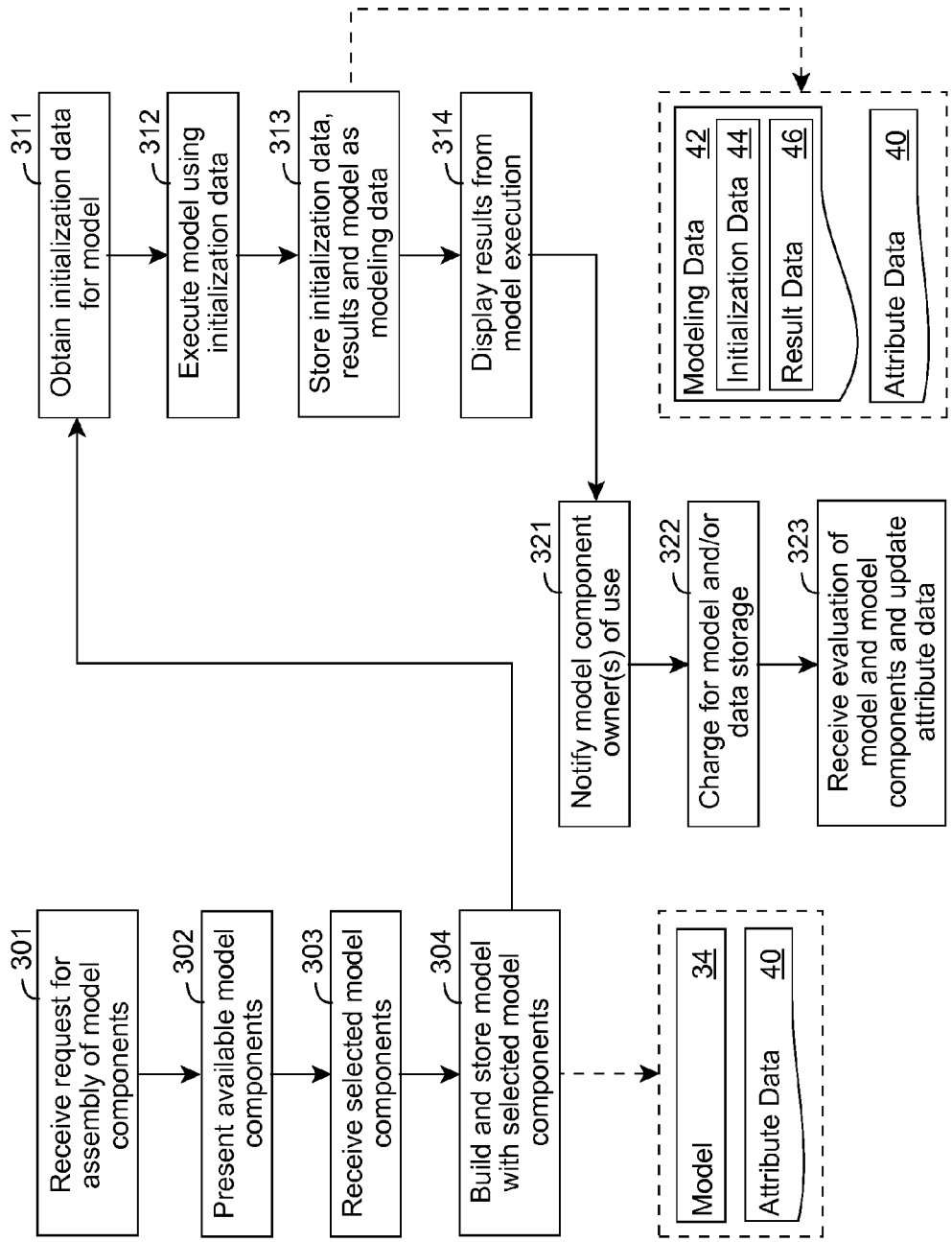

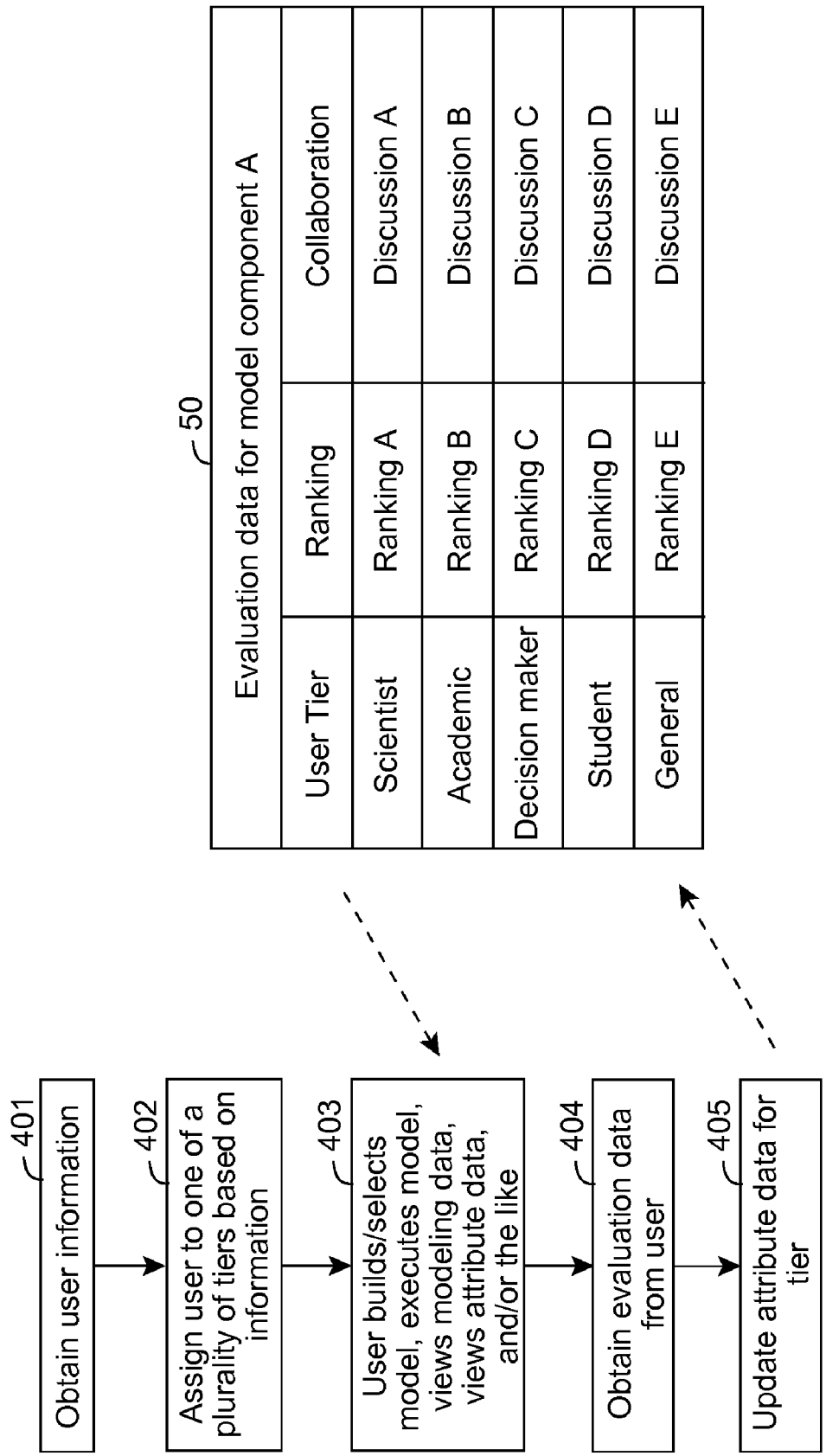

COLLABORATION FRAMEWORK FOR MODELING

TECHNICAL FIELD

The disclosure relates generally to modeling, and more particularly, to a collaboration framework for managing models.

BACKGROUND ART

Increasingly, modeling, such as scientific modeling, is an important tool for evaluating various systems and assumptions with respect to how these systems behave. Models are commonly used to simulate a system in order to explain observations of the behavior of a system, predict how a system will behave when one or more aspects of the system are changed, etc. Models can be developed and used to explain numerous types of scientific and/or business systems, such as climate, hydrology, geology, epidemiology, economic processes, business processes, etc.

Many models are complex, expensive to develop and/or run, and are made available only to the technical/scientific community that develops each model. Further, a model may only focus on a specific (however complex) set of input data, algorithms, and/or results for a system, which will limit its applicability to a narrow and specialized level of interest. Additionally, models are often written for a specific computing platform, which also restricts its usability for a larger, more diverse group of users.

SUMMARY OF THE INVENTION

The inventors recognize a desirability to make models and model development, particularly scientific models, available to larger, more diverse communities of users. For example, as individuals and entities become more environmentally conscious, they seek to adjust their behaviors accordingly. To this extent, there is an increasing demand for information that is derived from scientific modeling. However, the current implementation framework for scientific models (e.g., limited accessibility, expense, platform-dependency, etc.) greatly restricts access to this information to a small group of "informational elite". Since the ability of this informational elite to disseminate the information is limited, uninformed actions may be taken having adverse consequences to the environment.

Additionally, the inventors recognize that current implementations of models are inefficient. For example, multiple groups of researchers may be developing models that seek to explain the same system. Each model may include components (e.g., core algorithms) that closely match each other in function (e.g., same or similar input and output data fields), but differ in their implementations and corresponding effectiveness in generating accurate data. Currently, a user must select one model or the other, accepting the limitations of the model selected, or perform multiple simulation runs, each with a different model and attempt to merge the results. A more desirable implementation is to enable the user to utilize the strengths of both models. For example, the user could select the more effective components from two or more models and utilize them together to perform a single simulation run. The resulting simulation run can be both more effective as well as more efficient.

In view of the above limitations as well as others that will be recognized by a person of ordinary skill in the art, there is a need for a framework that enables the sharing of models, the components thereof, and modeling data.

Aspects of the invention provide a modeling solution, which enables various users to create, use, and evaluate models, such as scientific models, in various scenarios. To this extent, the modeling solution can define a model using one or more model components, each of which is configured to implement a modeling function using a set of standard execution rules. Additionally, the modeling solution can manage attribute data for each model/model component, which can include evaluation data for the corresponding model/model component. A user can review the attribute data and decide on a model/model component to use in a scenario. Subsequently, the user can provide initialization data for the scenario. The scenario can be executed, and result data for the scenario can be stored together with the initialization data. Users also can evaluate the scenario. In an embodiment, multiple users are classified into multiple tiers, and evaluation data is managed for each tier, thereby allowing users to effectively evaluate the model/model component among groups of users with similar concerns.

A first aspect of the invention provides a method of modeling, the method comprising: managing a plurality of computer-implemented model components, wherein each model component is configured to implement a modeling function using a set of standard execution rules; managing a set of models, wherein each model is configured to simulate a system, and wherein each model includes at least one of the plurality of model components; managing attribute data for each of the set of models and each of the plurality of model components, the attribute data including evaluation data for the corresponding model or model component; obtaining a selected model from a user; obtaining initialization data for the selected model; executing the selected model using the initialization data; and storing result data for the model execution.

A second aspect of the invention provides a modeling system, the system comprising: a component configured to manage a plurality of computer-implemented model components, wherein each model component is configured to implement a modeling function using a set of standard execution rules; a component configured to manage a set of models, wherein each model is configured to simulate a system, and wherein each model includes at least one of the plurality of model components; a component configured to manage attribute data for each of the set of models and each of the plurality of model components, the attribute data including evaluation data for the corresponding model or model component; a component configured to obtain a selected model from a user and initialization data for the selected model; a component configured to execute the selected model using the initialization data; and a component configured to store result data for the model execution.

A third aspect of the invention provides a computer program comprising program code embodied in at least one computer-readable medium, which when executed, enables a computer system to implement a method of modeling, the method comprising: managing a plurality of computer-implemented model components, wherein each model component is configured to implement a modeling function using a set of standard execution rules; managing a set of models, wherein each model is configured to simulate a system, and wherein each model includes at least one of the plurality of model components; managing attribute data for each of the set of models and each of the plurality of model components, the attribute data including evaluation data for the corresponding model or model component; obtaining a selected model from a user; obtaining initialization data for the selected model; executing the selected model using the initialization data; and storing result data for the model execution.

A fourth aspect of the invention provides a method of generating a system for modeling, the method comprising: providing a computer system operable to: manage a plurality of computer-implemented model components, wherein each model component is configured to implement a modeling function using a set of standard execution rules; manage a set of models, wherein each model is configured to simulate a system, and wherein each model includes at least one of the plurality of model components; manage attribute data for each of the set of models and each of the plurality of model components, the attribute data including evaluation data for the corresponding model or model component; obtain a selected model from a user; obtain initialization data for the selected model; execute the selected model using the initialization data; and store result data for the model execution.

A fifth aspect of the invention provides a method comprising: at least one of providing or receiving a copy of a computer program that is embodied in a set of data signals, wherein the computer program enables a computer system to implement a method of modeling, the method comprising: managing a plurality of computer-implemented model components, wherein each model component is configured to implement a modeling function using a set of standard execution rules; managing a set of models, wherein each model is configured to simulate a system, and wherein each model includes at least one of the plurality of model components; managing attribute data for each of the set of models and each of the plurality of model components, the attribute data including evaluation data for the corresponding model or model component; obtaining a selected model from a user; obtaining initialization data for the selected model; executing the selected model using the initialization data; and storing result data for the model execution.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows an illustrative process for creating model component(s) and model(s) for modeling a system on the computer system of FIG. 1 according to an embodiment.

FIG. 3 shows an illustrative process that a model developer can utilize to generate and run a model using the computer system of FIG. 1 according to an embodiment.

FIG. 4 shows an illustrative process for implementing a multi-tiered evaluation system according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
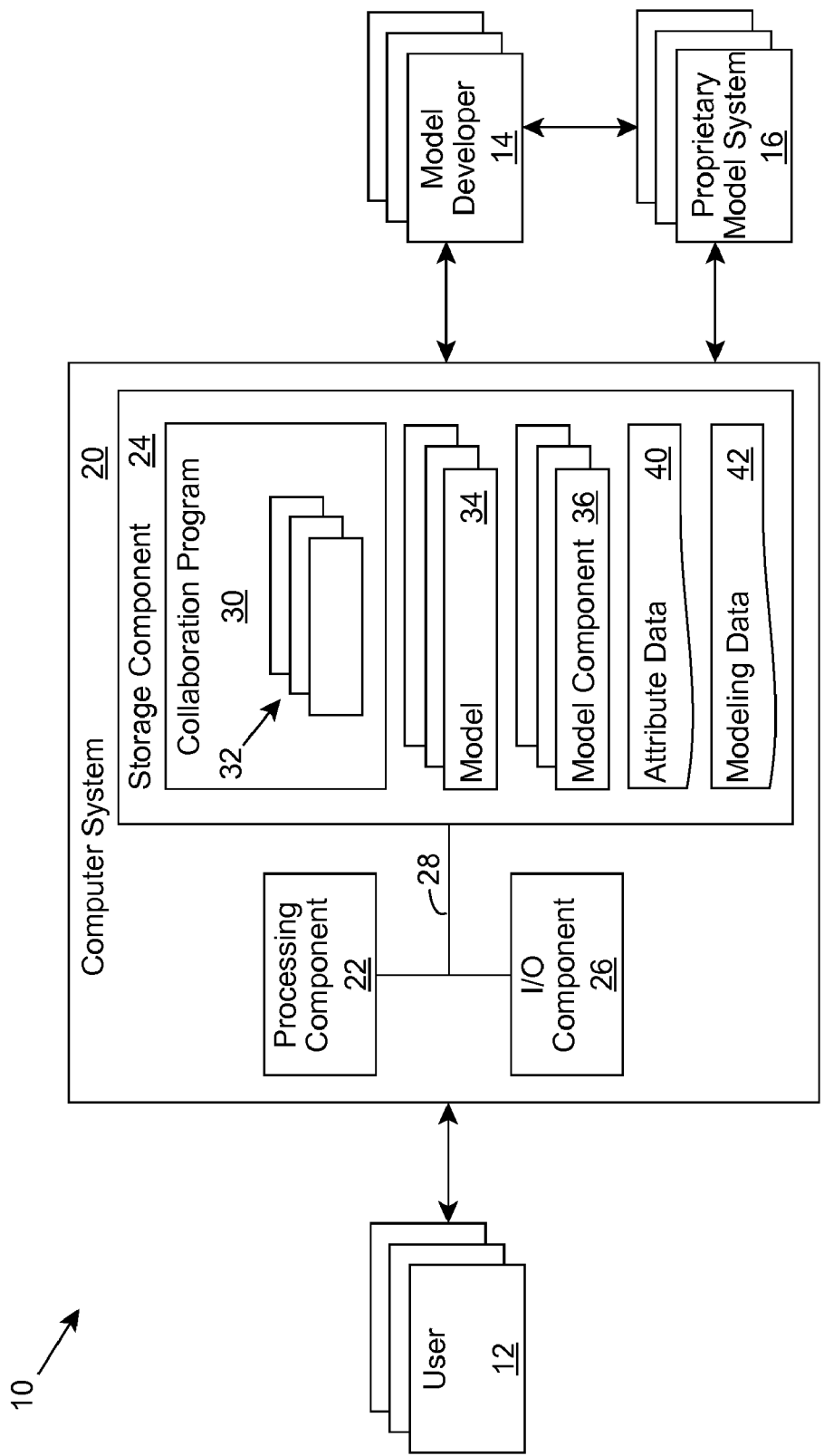
FIG. 1 shows an illustrative environment for managing system modeling according to an embodiment.

As indicated above, aspects of the invention provide a modeling solution, which enables various users to create, use, and evaluate models, such as scientific models, in various scenarios. To this extent, the modeling solution can define a model using one or more model components, each of which is configured to implement a modeling function using a set of standard execution rules. Additionally, the modeling solution can manage attribute data for each model/model component, which can include evaluation data for the corresponding model/model component. A user can review the attribute data and decide on a model/model component to use in a scenario. Subsequently, the user can provide initialization data for the scenario. The scenario can be executed, and result data for the scenario can be stored together with the initialization data. Users also can evaluate the scenario. In an embodiment, multiple users are classified into multiple tiers, and evaluation data is managed for each tier, thereby allowing users to effectively evaluate the model/model component among groups of users with similar concerns. As used herein, unless otherwise noted, the term "set" means one or more (i.e., at least one) and the phrase "any solution" means any now known or later developed solution.

Turning to the drawings, FIG. 1 shows an illustrative environment 10 for managing system modeling according to an embodiment. To this extent, environment 10 includes a computer system 20 that can perform a process described herein in order to manage model(s) 34 for system(s). In particular, computer system 20 is shown including a collaboration program 30, which makes computer system 20 operable to manage model(s) 34 for system(s) by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as collaboration program 30, which is at least partially embodied in storage component 24. While executing program code, processing component 22 can process data, which can result in reading and/or writing the data to/from storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user (e.g., a computer system being utilized by user 12) to communicate with computer system 20 using any type of communications link. To this extent, collaboration program 30 can manage a set of interfaces (e.g., graphical user interface(s), application program interface(s), and/or the like) that enable human and/or system users 12 to interact with collaboration program 30. Further, collaboration program 30 can manage (e.g., store, retrieve, create, manipulate, organize, present, etc.) the data, such as attribute data 40 and/or modeling data 42, using any solution.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c)

decompression. To this extent, collaboration program 30 can be embodied as any combination of system software and/or application software.

Further, collaboration program 30 can be implemented using a set of modules 32. In this case, a module 32 can enable computer system 20 to perform a set of tasks used by collaboration program 30, and can be separately developed and/or implemented apart from other portions of collaboration program 30. As used herein, the term "component" means any configuration of hardware, with or without software, which implements and/or enables a computer system 20 to implement the functionality described in conjunction therewith using any solution, while the term "module" means program code that enables a computer system 20 to implement the functionality described in conjunction therewith using any solution. When embodied in a tangible medium of expression, a module 32 is a component. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of collaboration program 30 embodied thereon (e.g., one or more modules 32). However, it is understood that computer system 20 and collaboration program 30 are only representative of various possible equivalent computer systems that may perform a process described herein. To this extent, in other embodiments, the functionality provided by computer system 20 and collaboration program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, collaboration program 30 enables computer system 20 to manage a set of models 34, each of which is configured to model (e.g., simulate) a system. Each model 34 can comprise any type of model and be configured to represent a portion or all of any type of system using any modeling technique. The system can comprise any combination of entities, phenomena, and/or processes, which are represented by model 34. A user 12 can apply each model 34 as part of any type of analysis of the system.

In an embodiment, each model 34 comprises a combination of one or more model components 36. To this extent, collaboration program 30 enables computer system 20 to manage a set of model components 36. Each model component 36 is configured to implement a modeling function and interact with (e.g., send/receive data) other model components 36 using a set of standard execution rules. The standard execution rules enable the development of model components 36 and models 34 by numerous model developers 14. In an embodiment, a model component 36 comprises an application that implements the modeling function, which can be executed by computer system 20. Alternatively, a model component 36 can comprise an application that conforms to the set of standard execution rules, and provides an interface to an application that implements the modeling function. In the latter case, the application may require execution by another computer system that is remote from computer system 20, such as a proprietary model system 16. For example, such a model component 36 can enable inclusion of an existing application that implements a modeling function using a proprietary computer system in the set of model components 36 without requiring redevelopment of the existing application (e.g., which may be incompatible with computer system 20). Additionally, computer system 20 can enable a model 34 to be included within another model 34 to create a more complex/comprehensive model 34 for a system.

In any event, collaboration program 30 also enables computer system 20 to manage attribute data 40 for each model 34 and model component 36. Attribute data 40 can include data on the functionality provided by the corresponding model 34 or model component 36, such as a description of the model 34 or model component 36, which can be provided by a model developer 14. Additionally, attribute data 40 can include an identification of the model developer 14 (e.g., name, title, company, and/or the like) and/or one or more attributes of model developer 14 (e.g., contact information, attribution information, and/or the like). Further, attribute data 40 can include an identification of an owner of the model 34/model component 36. The owner can comprise an entity/individual that can be contacted with any questions regarding the model 34/model component 36. Still further, attribute data 40 can include a usage fee for utilizing the model 34/model component 36 in a simulation scenario. The usage fee can be set by the model developer 14 and/or model owner. Additionally, the usage fee can include a charge set by an entity that manages computer system 20.

In an embodiment, attribute data 40 also includes evaluation data for the corresponding model 34 or model component 36. The evaluation data includes data that indicates how various users 12 and/or individuals in the community regard the model 34 or model component 36. Computer system 20 can obtain evaluation data using any solution. For example, computer system 20 can manage an interface that enables users 12 to provide evaluation data after reviewing and/or utilizing a model 34 and/or model component 36. Further, computer system 20 can obtain passive evaluation data from third party sources, such as attributions in articles, uses of the model 34 and/or model component 36 in published studies, and/or the like, using any solution (e.g., interface, web crawler(s), and/or the like).

In general, computer system 20 provides a collaboration framework that enables many model developers 14 to develop and contribute models 34 and model components 36, which can be utilized by many different users 12. To this extent, a model developer 14 can comprise a single individual or multiple individuals who collaborate to create a model 34 and/or model component(s) 36. A user 12 can comprise an individual and/or system that uses a model 34, reviews modeling data 42, which was generated by a model 34, and/or the like. It is understood that an individual can be both a model developer 14 and user 12, depending on the action(s) being performed by the individual.

Currently, many proprietary model systems 16 exist. A typical proprietary model system 16 can include an application that implements a model, and is configured to be executed on a specific computer system. For example, the application may be written in a platform-dependent variation of a higher level programming language (e.g., C/C++, FORTRAN, etc.) that requires compilation into machine language that is executable on the particular computer system. A model developer 14 or a third party may want to make some or all of one or more proprietary model systems 16 available as model(s) 34 and/or model component(s) 36.

To this extent, FIG. 2 shows an illustrative process for creating model component(s) 36 and model(s) 34 for modeling a system on computer system 20 according to an embodiment. Referring to FIGS. 1 and 2, in process 201, model developer 14 obtains information on a set of existing models (e.g., proprietary model systems 16) for modeling a system using any solution. For example, model developer 14 can analyze information on various existing models that are utilized to provide modeling for the system. The information can pertain to the input data required for the existing model, output data generated by the existing model, one or more algorithms implemented by the existing model, and/or the like. To this extent, model developer 14 may review, when available, articles that are written based on findings of a existing model, data generated using the existing model, functional diagrams, source code for the existing model, and/or the like. Further, model developer 14 may review attribute data 40 and/or model components 36 used to implement a model 34 that models the same system. In an embodiment, model developer 14 analyzes information available on multiple existing models utilized by various researchers/research organizations. In this case, model developer 14 can more readily identify/infer common features among the existing models for the system. However, model developer 14 may only analyze a single existing model for the system, e.g., one that is being converted to a model 34.

In process 202, model developer 14 identifies a set of functions that are common in most of the existing models for the system. Each function can comprise any algorithm that is implemented in most of the existing models, e.g., the calculation of a parameter that is utilized by the existing models, reading/writing data from/to a storage system, presentation of data to a user, etc. When model developer 14 only analyzes a single existing model, the functions can be identified from the single existing model. Further, model developer 14 can apply modeling and/or software development principles to identify the set of functions. For each identified function, model developer 14 can identify a set of inputs and a set of outputs for the function.

Model developer 14 can use the identified set of functions in creating model component(s) 36 and model(s) 34 for modeling the system based on one or more of the existing models. To this extent, in process 203, model developer 14 develops a model component 36 for a function identified in an existing model. For example, model developer 14 can create a model component 36 that implements a function using the same algorithm used in the existing model. Alternatively, model developer 14 can create a model component 36 that encapsulates a component of the existing model that implements the function. In this case, the model component 36 will call the component of the existing model to perform the function. In either case, the model component 36 will conform to the set of standard execution rules (e.g., invocation, parameter, result, etc.), which will enable model component 36 to be included as part of a model 34 in computer system 20.

In process 204, model developer 14 can register the model component 36 with the collaboration framework (e.g., collaboration program 30 and/or computer system 20) using any solution. For example, model developer 14 can utilize an interface provided by collaboration program 30, which enables model developer 14 to identify model component 36. Similarly, model developer 14 and/or computer system 20 can copy model component 36 to a particular storage location for model components 36. Regardless, once registered, model component 36 will be available for utilization in one or more models 34.

In process 205, computer system 20 can obtain attribute data 40 for the new model component 36 using any solution. For example, computer system 20 can generate an interface, which enables model developer 14 to provide attribute data 40. Attribute data 40 can include a name for the model component 36, a description of the function that is implemented by the model component 36 and the corresponding input(s) and output(s), usage rules for the model component 36, and/or the like. Additionally, attribute data 40 can include information on model developer 14, an owner, the algorithm implementing the function, and/or the like. Computer system 20 can store attribute data 40 for the model component 36 using any solution (e.g., records in a database) and present some or all of attribute data 40 to a user 12 evaluating model component 36.

In process 206, model developer 14 can determine whether another model component 36 requires development. If so, then the process returns to process 203. If not, in process 207, model developer 14 can create a new model 34 in the collaboration framework based on the existing model. In an embodiment, computer system 20 manages an interface that enables model developer 14 to define model 34 in a graphical manner. For example, the interface can enable model developer 14 to select a model component 36 and graphically connect inputs to the model component 36 to static and/or dynamic data sources and/or outputs of another model component 36. Computer system 20 can enforce data types for the inputs and outputs using any solution. Further, computer system 20 can enable model developer 14 to select a model component 36 from a plurality of equivalent model components 36, each of which implements the same function (e.g., each using a different algorithm).

Computer system 20 can store the model 34 using any solution. In an embodiment, computer system 20 uses a custom modeling language or a standard modeling language, or the like. Regardless model 34 can include execution rules for executing each of the set of model components 36 based on the corresponding data dependencies between the model components 36. Additionally, the modeling language can enable branches between model components 36, parallel execution of model components 36, selection of one of a plurality of model components 36, and/or the like. To this extent, the modeling language can enable a model developer 14 to define an encapsulating model component 36 (e.g., in process 203) that includes multiple model components 36, and can enable selection of based on an input to the encapsulating model component 36, parallel execution of multiple model components 36, abstraction of multiple model components 36 executed in sequence, and/or the like. It is understood that an encapsulating model component 36 can include one or more encapsulating model components 36 therein, providing for multiple levels of encapsulation. Similarly, a model 34 can be included in another model 34 and act as an encapsulating model component 36 in the other model 34.

Additionally, computer system 20 can obtain attribute data 40 (e.g., model developer 14 information, owner information, description of model, and/or the like), store attribute data 40, and present the attribute data 40 for the model 34 to users 12 using any solutions. In process 208, model developer 14 can determine whether another existing model is to be converted to a model 34. If so, the process returns to process 203. Otherwise, the process is complete. It is understood that the process of FIG. 2 is only illustrative. To this extent, one or more of the processes can be performed in parallel, by more than one model developer 14, in an automated/computer-assisted manner, and/or the like.

As a result of the process of FIG. 2, one or more existing models (e.g., scientific models), which may have been previously restricted to a particular computing platform and/or a specialized group of users, can be made accessible to a general user community, which can include users 12 of various backgrounds. Further, the new model(s) 34 are constructed in a manner that enables the interoperability of one or more of the model components 36 included therein, which enables the definition of new model(s) 34 using different combinations of the model components 36.

FIG. 3 shows an illustrative process that model developer 14 can utilize to generate and run a model 34 using computer system 20 according to an embodiment. In this process, a user 12 can act as a model developer 14 by generating a new model 34 that includes a new combination of model components 36, which may have been developed by various model developers 14, none of which are necessarily user 12. Referring to FIGS. 1 and 3, in process 301, computer system 20 can receive a request from model developer 14 for an assembly of model components 36 (e.g., a new model 34). Model developer 14 can generate the request using any solution (e.g., an interface generated by computer system 20). The request can include an explicit (e.g., designated by model developer 14) or implicit (e.g., based on a user profile) identification of a system that model developer 14 is interested in modeling.

In process 302, computer system 20 can present a list of available model components 36 for use in the model 34. To this extent, when the request includes an identification of the system, computer system 20 can present a list of model components 36 that are commonly used or intended for use in models 34 for the system. Computer system 20 also can present various attribute data 40 on each model component 36. For example, computer system 20 can present evaluation data for the model component 36 (e.g., a ranking, number of past uses, number of journal citations, etc.), a description of the model component 36, a fee for using the model component 36, information on the model developer 14 that developed the model component 36, and/or the like. Model developer 14 can utilize the attribute data 40 to select the model component(s) 36 for use in model 34. Additionally, computer system 20 can suggest one or more model components 36 for use based on, for example, the system being modeled, a previously selected model component 36, and/or the like. Further, computer system 20 can present a group of model components 36, each of which implements the same function, and any one of which model developer 14 can utilize to perform the function in model 34. Still further, model developer 14 can designate one or more requirements and/or sorting characteristics for model components 36 (e.g., developed by a particular model developer 14, costs less than a particular amount, positive evaluation data, and/or the like), which computer system 20 can use to filter/sort the available model components 36, which are presented to model developer 14.

In process 303, computer system 20 receives the model components 36 that are selected by model developer 14. Based on the selected model components 36, computer system 20 can generate and present attribute data 40 for the model 34 being developed. For example, the attribute data 40 can include a total fee for using the model 34 to simulate the system, attributions to model developer(s) 14 of the model components 36, which will be required when referencing the model 34, and/or the like.

In process 304, computer system 20 builds and stores the model 34 with the selected model components 36 using any solution. For example, computer system 20 can connect the various model components 36 in an automated or semi-automated manner based on the corresponding inputs and outputs for each model component 36. In addition to the model components 36, model developer 14 can define static data sources for one or more model components 36, attribute data 40, and/or the like, in order to define the entire model 34. However, it is understood that processes 302-304 can be performed in an iterative manner to build a model 34. For example, computer system 20 can manage an interface that enables the model developer 14 to visually select a model component 36, include it in the model 34, and connect it to another model component 36, using any solution, such as drag and drop. As a result of processes 301-304, computer system 20 will include a model 34, which is defined using a set of model components 36, and corresponding attribute data 40.

Rather than defining a new model 34, user 12 can select an existing model 34. User 12 can select a model 34 using any solution (e.g., by providing a model identifier to computer system 20), or review various models 34 that may be utilized and select one. In the latter case, computer system 20 can provide attribute data 40 for a set of models 34 for review by user 12. In an embodiment, user 12 can select a subset of models 34 based on one or more criteria, such as a system to be simulated, a fee, evaluation data, and/or the like. Subsequently, computer system 20 can determine the model(s) 34, if any, that meet the criteria, and provide attribute data 40 associated with the model(s) 34 for review by user 12. After reviewing the attribute data 40, user 12 can select a model 34 for use in a scenario using any solution.

After defining a new model 34 and/or selecting an existing model 34, a user 12 can define a scenario that utilizes the model 34, which is to be executed using computer system 20. To this extent, in process 311, computer system 20 can obtain initialization data 44 for the model 34 from user 12 using any solution. For example, computer system 20 can obtain an identification of a storage location for initialization data 44 for each input required for model 34, a copy of initialization data 44 stored remote from computer system 20, and/or the like. Initialization data 44 can comprise data stored in one or more files, data manually entered by user 12 (e.g., settings for the model 34), and/or the like. Additionally, computer system 20 can confirm that initialization data 44 is of the format required by model 34 using any solution (e.g., analysis of file(s), limited selection criteria, etc.).

In an embodiment, computer system 20 also obtains attribute data 40 for the initialization data 44 in process 311. For example, attribute data 40 can identify one or more attributes of the source(s) of initialization data 44 (e.g., information on how, when, where the data was collected). Further, attribute data 40 for initialization data 44 can identify user 12, information on user 12, a description of initialization data 44, a usage fee, and/or the like.

In process 312, computer system 20 can execute model 34 using initialization data 44. To this extent, computer system 20 can provide initialization data 44 for processing by a corresponding set of model components 36 in model 34. In an embodiment, each of multiple model components 36 require a unique portion of initialization data 44 as input data, which computer system 20 can provide to the corresponding model component 36. Computer system 20 can execute model component 36, which will generate output data based on the input data. In an embodiment, model component 36 encapsulates an actual implementation of the functionality provided by model component 36, which is executed on a system remote from computer system 20 (e.g., proprietary model system 16). In this case, model component 36 can provide the input data for processing by the model component on the remote computer system, and receive the output data from the model component, which can be utilized by model 34. In any event, computer system 20 can provide the output data as input data for processing by another model component 36 and/or as result data 46 for the scenario according to model 34.

In process 313, computer system 20 can store initialization data 44, result data 46 for the execution, and model 34 (or identifications thereof) as modeling data 42. In this manner, various users 12 can review and analyze the modeling data 42 that resulted from the executed scenario. In an embodiment, when a change is made to initialization data 44 and/or a model 34 after it is used in a scenario, computer system 20 can maintain the previous version of initialization data 44 and/or model 34 so that the scenario can be recreated. Further, computer system 20 can enable a user 12 that defined the scenario to delete modeling data 42 for the scenario. Computer system 20 also can store associated attribute data 40 for the modeling data 42 for the scenario. For example, the attribute data 40 can comprise attribute data 40 provided for the initialization data 44, model 34, and/or the like. Additionally, the attribute data 40 can include information on the execution of the scenario (e.g., date, system(s) used, version(s) of model component(s) 36, and/or the like).

In process 314, computer system 20 can generate an interface for displaying result data 46 for the scenario using any solution. For example, based on result data 46 generated by the scenario, computer system 20 can include visualization components, which can generate two, three, and/or four dimensional maps of result data 46. In an embodiment, model 34 includes a model component 36 that generates the interface as part of its execution. Additionally, computer system 20 can use model component 36 to provide/regenerate the interface without requiring re-execution of the entire model 34. Further, computer system 20 can generate an interface that enables a user 12 to view some or all of the additional modeling data 42 and/or attribute data 40 associated with result data 46.

In addition to enabling users 12 to define models 34, model components 36, and execute scenarios (e.g., execute a model 34 using a particular set of initialization data), computer system 20 can manage evaluations of the models 34 and model components 36 and transactions between model developers 14/owners and users 12. To this extent, in process 321, computer system 20 can send a notification to an owner of a model component 36 when the model component 36 is implemented in a new model 34 and/or used in a scenario (e.g., a model 34 including the model component 36 is executed). Similarly, when an existing model 34 is selected by user 12 and/or used in a scenario, computer system 20 can send a notification to an owner of the selection/use. In either case, the owner can review/monitor use of the model 34/model component 36, provide feedback to user(s) 12 on the model 34/model component 36, and/or the like.

In process 322, computer system 20 can charge user 12 for executing the scenario. For example, model 34 and/or one or more model components 36 may include a usage fee, which must be paid when the model component 36 is implemented in a model, the model 34/model component 36 is utilized in a scenario, and/or the like. In this case, computer system 20 can obtain payment information from user 12 (e.g., prior to executing the scenario), and upon execution of the scenario and receipt of the payment, forward some or all of the payment to the corresponding model 34/model component 36 owners. Additionally, an entity that manages computer system 20 can charge a fee for one or more of the services provided by computer system 20. For example, the entity can charge a fee for use of computer system 20 to execute the scenario, use of computer system 20 to store the result data, processing payments between users 12 and model 34/model component 36 owners, and/or the like.

In process 323, computer system 20 can receive evaluation data of model 34 and/or model component(s) 36 using any solution. For example, computer system 20 can prompt user 12 to provide the evaluation data after the scenario has been executed. Computer system 20 can request evaluation data on various aspects of the model 34 and/or model component(s) 36, such as accuracy of the data, ease of use, effectiveness, and/or the like. Further, computer system 20 can receive evaluation data from other users 12, e.g., users 12 that may review the result data for the scenario, owner(s) of model 34 and/or model components 36, and/or the like. Some or all of the evaluation data can comprise ranking data, which ranks one or more attributes of model 34 and/or model components 36 on a numeric scale. Regardless, upon receiving evaluation data from a user 12, computer system 20 can store the evaluation data as attribute data 40 for the corresponding model 34/model component 36, which computer system 20 can later present to users 12.

In an embodiment, computer system 20 implements a multi-tiered evaluation system. In particular, various users 12 will use various criteria in determining the effectiveness of a model 34 and/or model component 36 in simulating a system. To this extent, computer system 20 can assign each user 12 to one of a plurality of tiers of users. Each tier of users can be configured to group together users 12 having common/similar perspectives in evaluating the set of models 34 and the plurality of model components 36. In presenting attribute data 40 for a particular user 12, computer system 20 can present evaluation data for the corresponding user tier of the user 12 by default. In this manner, user 12 can consider the effectiveness/desirability of model 34 and/or model component 36 based on the evaluations of his/her peers, who are likely to have used similar criteria in evaluating the model 34/model component 36.

FIG. 4 shows an illustrative process for implementing a multi-tiered evaluation system, which can be implemented by computer system 20 (FIG. 1), according to an embodiment. Referring to FIGS. 1 and 4, in process 401, computer system 20 can obtain user information for a new user 12 that desires to register with computer system 20. The user information can include various information on user 12, such as his/her name, contact information, etc. Additionally, the user information can include information on the profession of user 12. For example, the user information can indicate whether user 12 is in academia, the private sector, or the public sector; whether user 12 is a manager, a researcher, a student, or the like; etc.

In process 402, computer system 20 can assign user 12 to one of a plurality of user tiers based on the user information. For example, FIG. 4 shows illustrative evaluation data 50 according to an embodiment. In this case, computer system 20 is shown implementing five user tiers, i.e., Scientist, Academic, Decision maker, Student, and General. In an embodiment, computer system 20 can confirm the user information prior to assigning a user 12 to one or more user tiers (e.g., Scientist, Academic, Decision maker) in order to prevent users from providing invalid data and thereby corrupting evaluation data 50 for the corresponding user tier. Further, computer system 20 can limit the functionality that a user 12 can be allowed to perform based on the corresponding user tier (e.g., only Scientist, Academic, or Decision maker users may be allowed to define and execute models 34). Still further, computer system 20 can enable users 12 to register without providing user information and/or use computer system 20 without registering, in which case the users 12 can be assigned to the General user tier.

In process 403, user 12 can interact with computer system 20 to perform one or more of various actions, such as build/select a model 34, execute a model 34, view modeling data 42 for a scenario, view attribute data 40 for a model 34, model component 36, scenario, etc., and/or the like. As part of performing an action, computer system 20 can provide evaluation data 50 for review by user 12. For example, computer system 20 provide evaluation data 50 that has been received from users in the same user tier as user 12 (e.g., ranking data). Further, computer system 20 can generate and provide evaluation data 50 that is a combination of evaluation data 50 received from all users (e.g., an average ranking of a model component 36 across all user tiers). Still further, computer system 20 can enable user 12 to selectively view evaluation data 50 from any of the plurality of user tiers.

In process 404, computer system 20 can obtain evaluation data 50 from user 12 using any solution. For example, computer system 20 can generate and user 12 can complete a scale-based ranking of a model 34/model component 36 in various performance categories, user 12 can enter static comments describing his/her evaluation of the model 34/model component 36, and/or the like. Additionally, computer system 20 can separately manage collaboration between users 12 of a particular user tier using a combination of any solutions, such as discussion threads, message boards, instant messaging/chat sessions, wiki, web logging, semantic search, tagging, and/or the like. For example, computer system 20 can keep evaluation data 50 used to generate tag clouds, or the like, relevant within a user tier (e.g., scientist or land manager) by keeping evaluation data 50 received from another user tier separate from the user tier (e.g., an educational peer group of sixth graders tag entry of "cool" would have no relevance in the science or land manager tag cloud).

In process 405, computer system 20 can update the attribute data 40 for a model 34, model component 36, or scenario based on evaluation data 50. For example, computer system 20 can store evaluation data 50 as part of attribute data 40 for the particular item. Further, computer system 20 can recalculate an overall ranking assigned to a model 34/model component 36 by users in the particular user tier. It is understood that computer system 20 can perform one or more of the processes 403, 404, 405 each time a user 12 utilizes computer system 20.

Further, computer system 20 can manage acknowledgement/credit for use of a model 34/model component 36. For example, computer system 20 can enable the model developers 14/owners to ensure that proper acknowledgement/credit is provided to the model developers 14/owners when use of their model 34/model component 36 results in an article/paper being published in a journal or the like. In this case, depending on their respective contributions, a model developer 14/owner may be required to be listed as a co-author (e.g., when a published paper makes use of the model 34/model component 36), acknowledged as a contributor (e.g., when a model component 36 is used in a model 34 that generates published results), and/or the like.

In an embodiment, computer system 20 can store accreditation data for a model 34/model component 36 as part of the corresponding attribute data 40. A user 12 can reference attribute data 40 for a model 34 to determine the proper accreditation for using the model 34, and subsequently include the accreditation when submitting a paper for publication. Further, computer system 20 can enable user 12 to contact model developers 14/owners for input into a paper prior to its submission, their desired accreditation, and/or the like. Still further, when computer system 20 determines that a model 34 has been used in a paper, computer system 20 can ensure that the proper accreditation was included using any solution. Additionally, computer system 20 can note the use of the model 34 (and corresponding model components 36) in the corresponding attribute data 40, which can enable users 12 to further evaluate the judgments of other users 12 with respect to the value of model 34/model component 36.

Computer system 20 can use some or all of attribute data 40 for a model 34/model component 36 to automatically generate a peer-based valuation of a model 34/model component 36, which computer system 20 can store as attribute data 40. For example, computer system 20 can combine attribute data 40, such as voting (e.g., crowd-sourcing of an assessment of the value of the model 34), a number of times model 34 has been used, a number of journal citations relating to the model 34, a nature of journal citations (positive/negative, prestige of the journal), a number of times the model 34 contributed to a journal paper, an amount of time that the model 34 has been available (e.g., a newer model may have fewer uses only due to its relative newness), user 12 evaluation data provided to computer system 20 (e.g., rankings, comments, etc.), and/or the like. Based on one or more of these factors, computer system 20 can generate a peer-based valuation of a model 34/model component 36, which can subsequently be used by users 12 in evaluating the model 34/model component 36.

Returning to FIG. 1, computer system 20 enables various users 12 and model developers 14 to collaborate in defining, using, and evaluating models 34 in various scenarios. These models can be highly complex models that seek to simulate complex real world systems. As a result, these models can require voluminous input data, and generate voluminous output data, which computer system 20 can store as modeling data 42, such as initialization data 44 (FIG. 3) and/or result data 46 (FIG. 3). To this extent, an entity managing computer system 20 can further charge a usage fee for managing modeling data 42. For example, the entity can set the usage fee based on the amount of initialization data 44 and/or result data 46 that the model 34 requires/generates.

While shown and described herein as a method and system for modeling, it is understood that aspects of the invention further provide various alternative embodiments. For example, in one embodiment, the invention provides a computer program embodied in at least one computer-readable medium, which when executed, enables a computer system to implement a method of modeling. To this extent, the computer-readable medium includes program code, such as collaboration program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as collaboration program 30 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for modeling. In this case, a computer system, such as computer system 20 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of modeling, the method comprising:
managing a plurality of computer-implemented model components, wherein each model component is configured to implement a modeling function using a set of standard execution rules;
managing a set of models, wherein each model is configured to simulate a system, and wherein each model includes at least one of the plurality of model components;
managing attribute data for each of the set of models and each of the plurality of model components, the attribute data including evaluation data for the corresponding model or model component, wherein the evaluation data comprises at least one metric associated with an effectiveness of the corresponding model or model component, and wherein the at least one metric is based on at least one of: prior user feedback for the corresponding model or model component or third party citations of the corresponding model or model component;
obtaining a selected model from a user, wherein the obtaining includes providing the evaluation data for presentation to the user;
obtaining initialization data for the selected model;
executing the selected model using the initialization data; and
storing result data for the model execution.

2. The method of claim 1, wherein the evaluation data includes evaluation data for each of a plurality of tiers of users, and wherein each user tier includes a set of users having a common perspective in using and evaluating the set of models and the plurality of model components.

3. The method of claim 2, wherein the evaluation data includes ranking data, the ranking data including a separate ranking for each of the plurality of tiers of users.

4. The method of claim 1, wherein the obtaining a selected model includes:
enabling the user to define a new model using at least one of the plurality of model components;
obtaining attribute data for the new model, the attribute data including the user, attribution information for the user, and a description of the model; and
storing the new model in the set of models.

5. The method of claim 1, further comprising managing attribute data for the initialization data and the result data, wherein the obtaining initialization data includes obtaining attribute data for the initialization data, the attribute data including the user, attribution information for the user, and a description of the initialization data.

6. The method of claim 1, wherein the obtaining a selected model includes:
providing attribute data for at least one of the set of models for review by the user; and
receiving the selected model from the user, the selected model comprising one of the set of models.

7. The method of claim 6, further comprising providing notification of the model selection to an owner of the selected model in response to the receiving.

8. The method of claim 1, wherein the attribute data for at least one of: the selected model or at least one model component includes a usage fee, the method further comprising obtaining payment information for the selected model from the user.

9. The method of claim 1, wherein the attribute data for at least one of: the selected model or at least one model component includes accreditation data for use of the selected model or the at least one model component.

10. The method of claim 1, wherein the managing attribute data includes calculating a peer-based valuation for at least one of: a model or a model component based on a plurality of attributes of the at least one of: a model or a model component.

11. The method of claim 1, further comprising obtaining payment information for at least one of: the executing or the storing.

12. A modeling system, the system comprising:
a computer system for modeling, the computer system comprising at least one computing device, the modeling including:
managing a plurality of computer-implemented model components, wherein each model component is configured to implement a modeling function using a set of standard execution rules;
managing a set of models, wherein each model is configured to simulate a system, and wherein each model includes at least one of the plurality of model components;
managing attribute data for each of the set of models and each of the plurality of model components, the attribute data including evaluation data for the corresponding model or model component, wherein the evaluation data comprises at least one metric associated with an effectiveness of the corresponding model or model component, and wherein the at least one metric is based on at least one of: prior user feedback for the corresponding model or model component or third party citations of the corresponding model or model component;

obtaining a selected model from a user and initialization data for the selected model, wherein the obtaining includes providing the evaluation data for presentation to the user;

executing the selected model using the initialization data; and storing result data for the model execution.

13. The system of claim 12, wherein the evaluation data includes evaluation data for each of a plurality of tiers of users, and wherein each user tier includes a set of users having a similar perspective in using and evaluating the set of models and the plurality of model components.

14. The system of claim 12, wherein the obtaining a selected model enables the user to define a new model using at least one of the plurality of model components; obtains attribute data for the new model, the attribute data including the user, attribution information for the user, and a description of the model; and stores the new model in the set of models.

15. The system of claim 12, the modeling further comprising managing attribute data for the initialization data and the result data, the attribute data including the user, attribution information for the user, and a description of the initialization data.

16. The system of claim 12, the modeling further comprising providing notification of a model selection to an owner of the selected model in response to receiving the model selection from a user.

17. The system of claim 12, wherein the attribute data for at least one of: the selected model or at least one model component includes a usage fee, the modeling further comprising obtaining payment information for the selected model from the user.

18. A non-transitory computer-readable storage medium storing computer executable instructions, which when executed by a computer system implement a method of modeling, the method comprising:

managing a plurality of computer-implemented model components, wherein each model component is configured to implement a modeling function using a set of standard execution rules;

managing a set of models, wherein each model is configured to simulate a system, and wherein each model includes at least one of the plurality of model components;

managing attribute data for each of the set of models and each of the plurality of model components, the attribute data including evaluation data for the corresponding model or model component, wherein the evaluation data comprises at least one metric associated with an effectiveness of the corresponding model or model component, and wherein the at least one metric is based on at least one of: prior user feedback for the corresponding model or model component or third party citations of the corresponding model or model component;

obtaining a selected model from a user, wherein the obtaining includes providing the evaluation data for presentation to the user;

obtaining initialization data for the selected model;

executing the selected model using the initialization data; and storing result data for the model execution.

19. The storage medium of claim 18, wherein the evaluation data includes evaluation data for each of a plurality of tiers of users, and wherein each user tier includes a set of users having a common perspective in using and evaluating the set of models and the plurality of model components.

20. The storage medium of claim 18, wherein the obtaining a selected model includes:

enabling the user to define a new model using at least one of the plurality of model components;

obtaining attribute data for the new model, the attribute data including the user, attribution information for the user, and a description of the model; and storing the new model in the set of models.

21. The storage medium of claim 18, the method further comprising providing notification of the model selection to an owner of the selected model in response to the receiving.

22. The storage medium of claim 18, wherein the attribute data for at least one of: the selected model or at least one model component includes a usage fee, the method further comprising obtaining payment information for the selected model from the user.

23. A method of generating a system for modeling, the method comprising:

providing a computer system operable to:

manage a plurality of computer-implemented model components, wherein each model component is configured to implement a modeling function using a set of standard execution rules;

manage a set of models, wherein each model is configured to simulate a system, and wherein each model includes at least one of the plurality of model components;

manage attribute data for each of the set of models and each of the plurality of model components, the attribute data including evaluation data for the corresponding model or model component, wherein the evaluation data comprises at least one metric associated with an effectiveness of the corresponding model or model component, and wherein the at least one metric is based on at least one of: prior user feedback for the corresponding model or model component or third party citations of the corresponding model or model component;

obtain a selected model from a user, wherein the obtaining includes providing the evaluation data for presentation to the user;

obtain initialization data for the selected model;

execute the selected model using the initialization data; and store result data for the model execution.

* * * * *